US012627238B2

(12) United States Patent
Ni

(10) Patent No.: US 12,627,238 B2
(45) Date of Patent: May 12, 2026

(54) POWER CONVERSION CIRCUIT WITH VOLTAGE BALANCING

(71) Applicant: LITE-ON TECHNOLOGY CORPORATION, Taipei (TW)

(72) Inventor: Ting-Fu Ni, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 251 days.

(21) Appl. No.: 18/396,754

(22) Filed: Dec. 27, 2023

(65) Prior Publication Data

US 2024/0348175 A1 Oct. 17, 2024

(30) Foreign Application Priority Data

Apr. 11, 2023 (TW) .................................. 112113466

(51) Int. Cl.
*H02M 3/335* (2006.01)
*H02M 1/34* (2007.01)

(52) U.S. Cl.
CPC ....... *H02M 3/33576* (2013.01); *H02M 1/348* (2021.05); *H02M 3/33569* (2013.01); *H02M 3/33584* (2013.01); *H02M 3/33592* (2013.01)

(58) Field of Classification Search
CPC ............. H02M 3/33576; H02M 1/348; H02M 3/33584; H02M 3/33569; H02M 3/33592
See application file for complete search history.

(56) References Cited

U.S. PATENT DOCUMENTS

| | | | | |
|---|---|---|---|---|
| 4,890,210 A | * | 12/1989 | Myers ............... | H02M 3/33507 363/61 |
| 5,661,642 A | * | 8/1997 | Shimashita ............. | H02M 1/36 363/21.18 |
| 5,880,943 A | * | 3/1999 | Yokoyama .............. | H02M 1/34 363/56.05 |
| 6,064,580 A | * | 5/2000 | Watanabe ......... | H02M 3/33592 363/127 |

(Continued)

FOREIGN PATENT DOCUMENTS

TW 202121811 A 6/2021

OTHER PUBLICATIONS

Office Action issued by Taiwan Intellectual Property Office on Apr. 12, 2024.

*Primary Examiner* — Yusef A Ahmed
(74) *Attorney, Agent, or Firm* — WPAT, PC

(57) ABSTRACT

A power conversion circuit, includes the following elements. A transformer, includes a primary side winding, a first secondary side winding and a second secondary side winding. A first switching circuit, connected to the primary side winding. A second switching circuit, connected to the first secondary side winding. A third switching circuit, connected to the second secondary side winding. A first output capacitor, connected to the second switching circuit and the first secondary side winding, and has a first voltage value. The second output capacitor, connected to the third switching circuit and the second secondary side winding, and has a second voltage value. A control circuit, controls the first switching circuit, the second switching circuit and the third switching circuit to be turned-on or turned-off according to the first voltage value and the second voltage value, so as to charge the first output capacitor or the second output capacitor.

9 Claims, 10 Drawing Sheets

(56) References Cited

U.S. PATENT DOCUMENTS

| | | | | |
|---|---|---|---|---|
| 6,552,917 B1* | 4/2003 | Bourdillon | ........ | H02M 3/33561 |
| | | | | 363/21.12 |
| 8,243,473 B2* | 8/2012 | Chen | ................ | H02M 3/33573 |
| | | | | 363/16 |
| 11,336,191 B1* | 5/2022 | Chan | .................... | H02M 1/088 |
| 2002/0118551 A1* | 8/2002 | Ishii | ................. | H02M 3/33561 |
| | | | | 363/16 |
| 2003/0086282 A1* | 5/2003 | Zeng | ................ | H02M 3/33592 |
| | | | | 363/95 |
| 2006/0104097 A1* | 5/2006 | Tsuruya | ................ | H02M 3/155 |
| | | | | 363/55 |
| 2006/0158908 A1* | 7/2006 | Usui | ................ | H02M 3/33561 |
| | | | | 363/15 |
| 2007/0138870 A1* | 6/2007 | Kyono | ............... | H02M 3/3353 |
| | | | | 307/17 |
| 2009/0059622 A1* | 3/2009 | Shimada | ................. | H02M 1/32 |
| | | | | 363/17 |
| 2009/0251925 A1* | 10/2009 | Usui | ................ | H02M 3/33561 |
| | | | | 363/16 |
| 2010/0109434 A1* | 5/2010 | Kyono | ............. | H02M 3/33561 |
| | | | | 307/31 |
| 2011/0002146 A1* | 1/2011 | Kyono | ............. | H02M 3/33507 |
| | | | | 363/21.12 |
| 2011/0032732 A1* | 2/2011 | Hsu | .................. | H02M 3/33561 |
| | | | | 363/21.14 |
| 2011/0310639 A1* | 12/2011 | Hsu | .................. | H02M 3/33561 |
| | | | | 363/21.14 |
| 2012/0313433 A1* | 12/2012 | Uno | ........................ | H02M 3/01 |
| | | | | 307/31 |
| 2013/0250622 A1* | 9/2013 | Hosotani | .......... | H02M 3/33576 |
| | | | | 363/16 |
| 2013/0271187 A1* | 10/2013 | Hayashi | ............... | H03K 17/163 |
| | | | | 327/109 |
| 2014/0146577 A1* | 5/2014 | Uno | ........................ | H02M 3/01 |
| | | | | 363/21.02 |
| 2016/0172958 A1* | 6/2016 | Lee | ........................ | H02H 3/247 |
| | | | | 363/21.02 |
| 2016/0190939 A1* | 6/2016 | Pernyeszi | ............. | H05B 45/39 |
| | | | | 315/185 R |
| 2016/0359420 A1* | 12/2016 | Chen | ...................... | H05B 45/10 |
| 2017/0048937 A1* | 2/2017 | Wang | ..................... | H05B 47/19 |
| 2018/0091039 A1* | 3/2018 | Bastholm | ............... | H02M 1/34 |
| 2019/0089264 A1* | 3/2019 | Hirose | ................. | H02M 3/285 |
| 2019/0267906 A1* | 8/2019 | Zhang | ................... | H02M 1/083 |
| 2019/0363634 A1* | 11/2019 | Pierrat | ............. | H02M 3/33507 |
| 2020/0083817 A1* | 3/2020 | Liu | ..................... | H02M 1/08 |
| 2020/0251998 A1* | 8/2020 | Jin | ..................... | H02M 3/01 |
| 2021/0152095 A1* | 5/2021 | Lin | .................. | H02M 3/33573 |
| 2021/0175794 A1* | 6/2021 | Shang | ............. | H02M 3/33523 |
| 2022/0115956 A1* | 4/2022 | Teng | ................ | H02M 3/33576 |
| 2023/0029203 A1* | 1/2023 | Kim | ........................ | H02M 1/32 |
| 2023/0116349 A1* | 4/2023 | Shirazi | ................... | H02M 7/48 |
| | | | | 257/76 |
| 2023/0223842 A1* | 7/2023 | Chan | ...................... | H02M 1/44 |
| | | | | 363/13 |
| 2024/0396457 A1* | 11/2024 | Chromcak | ......... | H02M 1/0025 |

* cited by examiner

POWER CONVERSION CIRCUIT WITH VOLTAGE BALANCING

This application claims the benefit of Taiwan application Serial No. 112113466, filed Apr. 11, 2023, the disclosure of which is incorporated by reference herein in its entirety.

TECHNICAL FIELD

The present disclosure relates to an electronic circuit, and in particular, relates to a power conversion circuit having a function of voltage balancing.

BACKGROUND

FIG. 1 is a circuit diagram of a power device 2000 in the prior art. The power device 2000 includes an input power supply 700, a processing circuit 800, a load circuit 600 and a first output capacitor Cb1 and a second output capacitor Cb2. The processing circuit 800 is connected to the input power supply 700 and the load circuit 600, the processing circuit 800 is used to adjust the amplitude and/or phase of the voltage and/or current provided by the input power supply 700. When the load circuit 600 is an inverter, the first output capacitor Cb1 is connected to the second output capacitor Cb2 in series, and the first output capacitor Cb1 and the second output capacitor Cb2 have larger capacitance values to store electrical energy. Since the parameters of the circuit parasitic elements of the first output capacitor Cb1 and the second output capacitor Cb2 are different, the voltages of the first output capacitor Cb1 and the second output capacitor Cb2 may be unbalanced. The processing circuit 800 may further comprise a balancing circuit (not shown in FIG. 1) to handle the condition of voltage imbalance.

The balanced circuit in the prior art includes active components, passive components and inductors (not shown in FIG. 1), which form a buck converter and a boost converter and apply on the first output capacitor Cb1 and the second output capacitor Cb2 so as to reach voltage balance. However, adding a balanced circuit means adding more components (such as the above-mentioned active components, passive components and inductors), which leads to an increase in hardware costs.

Therefore, it is necessary to improve the processing circuit 800 in the power device 2000 to replace the balancing circuit in the prior art with a more simplified circuit architecture, so as to perform the function of voltage balancing.

SUMMARY

The disclosure is directed to a power conversion circuit, which provides a function of voltage balancing.

According to one embodiment, a power conversion circuit is provided. The power conversion circuit includes the following elements. A transformer, comprises a primary side winding, a first secondary side winding and a second secondary side winding. A first switching circuit, is connected to the primary side winding. A second switching circuit, is connected to the first secondary side winding. A third switching circuit, is connected to the second secondary side winding. A first output capacitor, is connected to the second switching circuit and the first secondary side winding, the first output capacitor has a first voltage value. A second output capacitor, is connected to the third switching circuit and the second secondary side winding, the second output capacitor has a second voltage value. A control circuit, is electrically connected to the first switching circuit, the second switching circuit and the third switching circuit. The control circuit controls the first switching circuit, the second switching circuit and the third switching circuit to be turned-on or turned-off respectively according to the first voltage value and the second voltage value, and to charge the first output capacitor or the second output capacitor.

Figure 1:
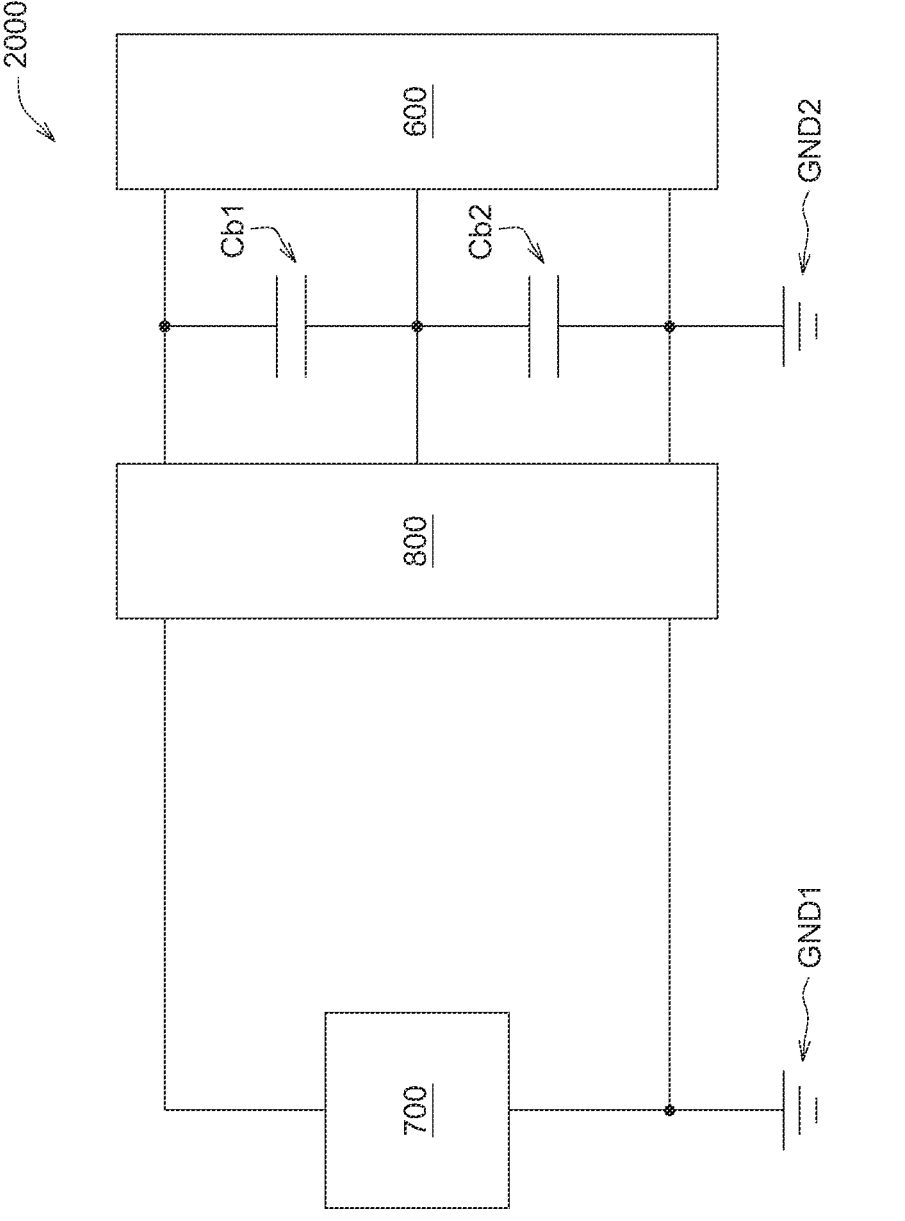
FIG. 1 (Prior Art) is a circuit diagram of a power device 2000 in the prior art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2A:
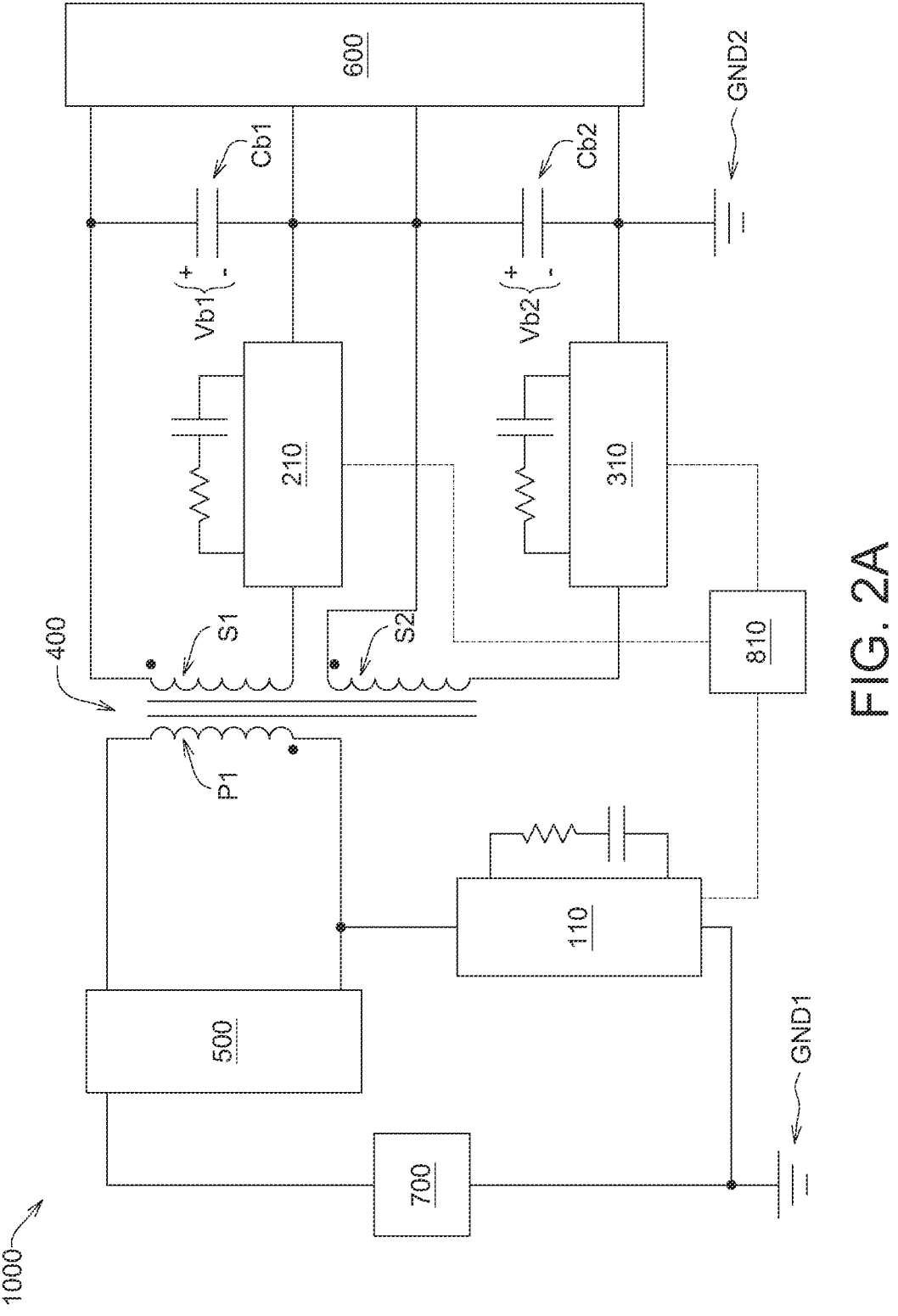
FIG. 2A is a block diagram of a power conversion circuit 1000 according to an embodiment of the present disclosure.

FIG. 2A is a block diagram of a power conversion circuit 1000 according to an embodiment of the present disclosure. As shown in FIG. 2A, the power conversion circuit 1000 includes a control circuit 810, a transformer 400, a first switching circuit 110, a second switching circuit 210, a third switching circuit 310, a first output capacitor Cb1, a second output capacitor Cb2 and a snubber circuit 500. The power conversion circuit 1000 is electrically connected to the input power supply 700 and the load circuit 600. The power conversion circuit 1000 is used to adjust the amplitude and/or phase of the voltage provided by the input power supply 700, and adjust the amplitude and/or phase of the current provided by the input power supply 700. The adjusted voltage and current will be provided to the load circuit 600.

The transformer 400 has a primary side and a secondary side. The primary side is provided with a primary side winding P1, and the secondary side is provided with a first secondary side winding S1 and a second secondary side winding S2. The first secondary side winding S1 has a turns number TNS1 and the second secondary side winding S1 has a turns number TNS2. The first secondary side winding S1 and the second secondary side winding S2 have a turns ratio TNS_R, and the turns ratio TNS_R is equal to the turns number TNS2 divided by the turns number TNS1. In one example, the turns ratio TNS_R is, for example, "1", indicating that the turns number TNS1 of the first secondary side winding S1 is equal to the turns number TNS2 of the second secondary side winding S2.

The primary side winding P1 is connected to the first switching circuit 110 and the snubber circuit 500, and the first switching circuit 110 is connected to the snubber circuit 500. The snubber circuit 500 is connected to the input power supply 700. On the other hand, the first secondary side winding S1 is connected to the second switching circuit 210 and the first output capacitor Cb1, and the second switching circuit 210 is connected to the first output capacitor Cb1. Similarly, the second secondary side winding S2 is connected to the third switching circuit 310 and the second output capacitor Cb2, and the third switching circuit 310 is connected to the second output capacitor Cb2.

The first output capacitor Cb1 and the second output capacitor Cb2 are both connected to the same load circuit 600. Alternatively, the first output capacitor Cb1 and the second output capacitor Cb2 are respectively connected to different load circuits (not shown in FIG. 2A). The first output capacitor Cb1 has a voltage value Vb1, and the voltage value Vb1 may be referred to as the "first voltage value". The second output capacitor Cb2 has a voltage value Vb2, and the voltage value Vb2 may be referred to as the "second voltage value".

The control circuit 810 is electrically connected to the first switching circuit 110, the second switching circuit 210 and the third switching circuit 310. According to the voltage value Vb1 of the first output capacitor Cb1 and the voltage value Vb2 of the second output capacitor Cb2, the control circuit 810 controls the first switching circuit 110, the second switching circuit 210 and the third switching circuit 310 to be turned-on or turned-off (i.e., open circuit or disconnected) respectively, thereby charging the first output capacitor Cb1 or the second output capacitor Cb2, so that the voltage value Vb1 of the first output capacitor Cb1 and the voltage value Vb2 of the second output capacitor Cb2 satisfies a predetermined condition. The predetermined condition is, for example, voltage value Vb1 is equal to voltage value Vb2.

Figure 2B:
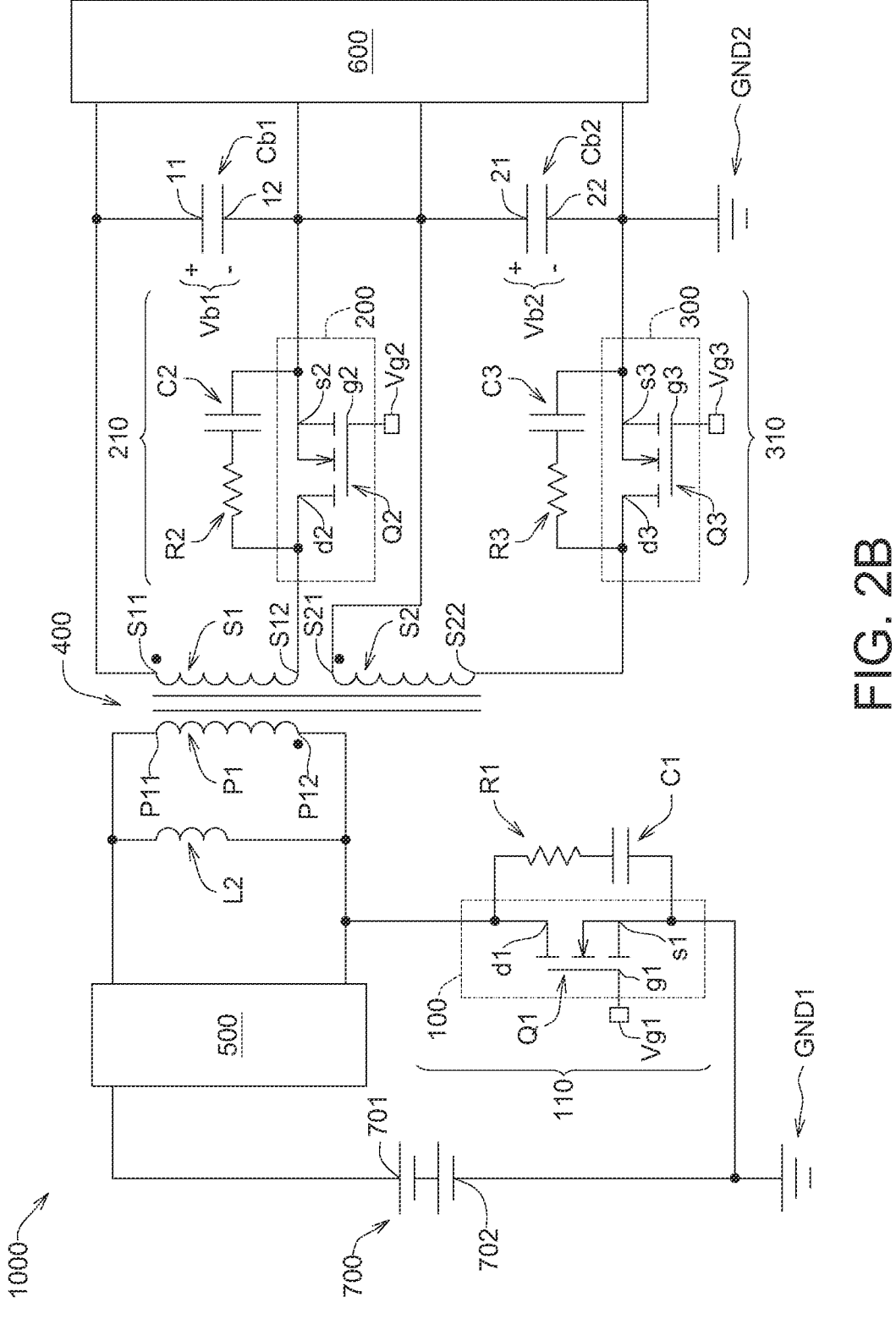
FIG. 2B is a circuit diagram of the power conversion circuit 1000 of FIG. 2A.

FIG. 2B is a circuit diagram of the power conversion circuit 1000 of FIG. 2A. The control circuit 810 is omitted in FIG. 2B. As shown in FIG. 2B, the first output capacitor Cb1 is connected to the second output capacitor Cb2 in series. In one example, the first terminal 11 and the second terminal 12 of the first output capacitor Cb1 and the first terminal 21 and the second terminal 22 of the second output capacitor Cb2 are both connected to the same load circuit 600. In another example, the first output capacitor Cb1 and the second output capacitor Cb2 are respectively connected to different load circuits (not shown in FIG. 2B). When the load circuit 600 is an inverter, the first output capacitor Cb1 and the second output capacitor Cb2 are referred to as bus capacitors. The first output capacitor Cb1 and the second output capacitor Cb2 have larger capacitance values to facilitate storage of electrical energy. The voltage value Vb1 of the first output capacitor Cb1 is the cross voltage between the first terminal 11 and the second terminal 12 of the first output capacitor Cb1. The voltage value Vb2 of the second output capacitor Cb2 is the cross voltage between the first terminal 21 and the second terminal 22 of the second output capacitor Cb2.

The first terminal S11 of the first secondary side winding S1 is connected to the first terminal 11 of the first output capacitor Cb1, and the second terminal S12 of the first secondary side winding S1 is connected to the second terminal 12 of the first output capacitor Cb1 through the second switching circuit 210.

The second switching circuit 210 includes a second switch 200, a resistor R2 and a capacitor C2. The resistor R2 and capacitor C2 are connected with each other in series. The second switch 200 is connected between the second terminal S12 of the first secondary side winding S1 and the second terminal 12 of the first output capacitor Cb1. The second switch 200 is, for example, a transistor Q2. The transistor Q2 may be selectively turned-on or turned-off, so as to perform a switching function. The transistor Q2 has a gate g2, a drain d2 and a source s2. The drain d2 is connected to the second terminal S12 of the first secondary side winding S1, the source s2 is connected to the second terminal 12 of the first output capacitor Cb1, and the gate g2 receives a control voltage Vg2 from the control circuit 810 (not shown in FIG. 2B). In one example, the drain d2 of the transistor Q2 is connected to the resistor R2, and the source s2 is connected to the capacitor C2.

The transistor Q2 is, for example, an enhanced type NMOS transistor. The transistor Q2 is selectively turned-on or turned-off in response to the control voltage Vg2. When the control voltage Vg2 is a first potential with a higher voltage value (the first potential is, for example, 15V), the transistor Q2 is turned-on. When the control voltage Vg2 is a second potential with a lower voltage value (the second potential is, for example, 0V), the transistor Q2 is turned-off. When the transistor Q2 is turned-on, the second terminal S12 of the first secondary side winding S1 may be bi-directionally conducted to the second terminal 12 of the first output capacitor Cb1. On the other hand, the second switching circuit 210 may further comprise a parasitic diode (not shown in FIG. 2B). When the transistor Q2 is turned-off, the second switching circuit 210 may be uni-directionally conducted through the parasitic diode.

The first terminal S21 of the second secondary side winding S2 is connected to the first terminal 21 of the second output capacitor Cb2, and the second terminal S22 of the second secondary side winding S2 is connected to the second terminal 22 of the second output capacitor Cb2 and the ground terminal GND2 through the third switching circuit 310.

The third switching circuit 310 includes a third switch 300, a resistor R3 and a capacitor C3. The resistor R3 and capacitor C3 are connected in series with each other. The third switch 300 is connected between the second terminal S22 of the second secondary side winding S2 and the second terminal 22 of the second output capacitor Cb2. The third switch 300 is, for example, a transistor Q3. The transistor Q3 may be selectively turned-on or turned-off, as to perform a switching function. Transistor Q3 has a gate g3, a drain d3 and a source s3. The drain d3 is connected to the second terminal S22 of the second secondary side winding S2, the source s3 is connected to the second terminal 22 of the second output capacitor Cb2, and the gate g3 receives the control voltage Vg3 provided by the control circuit 810. In one example, the drain d3 of the transistor Q3 is connected to the resistor R3, and the source s3 is connected to the capacitor C3.

The transistor Q3 is, for example, an enhancement-type NMOS transistor, which may be selectively turned-on or turned-off in response to the control voltage Vg3. When the transistor Q3 is turned-on, the second terminal S22 of the second secondary side winding S2 may be bi-directionally conducted to the second terminal 22 of the second output capacitor Cb2. Similar to the second switching circuit 210, the third switching circuit 310 may also include a parasitic diode. When the transistor Q3 is turned-off, the third switching circuit 310 may be uni-directionally conducted through the parasitic diode (not shown in FIG. 2B).

The first terminal P11 of the primary side winding P1 is connected to the snubber circuit 500, and the second terminal P12 of the primary side winding P1 is connected to the snubber circuit 500 and the first switching circuit 110. The snubber circuit 500 is connected to the first terminal 701 of the input power supply 700, and the second terminal 702 of the input power supply 700 is connected to the first switching circuit 110 and the ground terminal GND1. In an example, the primary side winding P1 may be connected to the inductor L2 in parallel.

The first switching circuit 110 includes a first switch 100, a resistor R1 and a capacitor C1. The resistor R1 and capacitor C1 are connected in series with each other. The first switch 100 is connected between the second terminal P12 of the primary side winding P1 and the ground terminal GND1. The first switch 100 is, for example, a transistor Q1. The transistor Q1 may be selectively turned-on or turned-off, so as to perform a switching function. The transistor Q1 has a gate g1, a drain d1 and a source s1. The drain d1 is connected to the second terminal P12 of the primary side winding P1, the source s1 is connected to the ground terminal GND1 and the second terminal 702 of the input power supply 700, and the gate g1 receives the control voltage Vg1 provided by the control circuit 810. In one example, the drain d1 of the transistor Q1 is connected to the resistor R1, and the source s1 is connected to the capacitor C1.

The transistor Q1 is, for example, an enhancement-type NMOS transistor, which may be selectively turned-on or turned-off in response to the control voltage Vg1. When the transistor Q1 is turned-on, the second terminal P12 of the primary side winding P1 may be electrically connected to the second terminal 702 of the input power supply 700. When the transistor Q1 is turned-off, the first switching circuit 110 is turned-off.

The control circuit 810 may respectively control the first switching circuit 110, the second switching circuit 210 and the third switching circuit 310 to be bi-directionally conducted, uni-directionally conducted or cut off. For example, the first switch 100 of the first switching circuit 110 receives the control voltage Vg1 from the control circuit 810, and the first switch 100 is turned-on or turned-off in response to the control voltage Vg1. Similarly, the second switch 200 of the second switching circuit 210 receives the control voltage Vg2 from the control circuit 810, and the second switch 200 is turned-on or turned-off in response to the control voltage Vg2. The third switch 300 of the third switching circuit 310 receives the control voltage Vg3 from the control circuit 810, and the third switch 300 is turned-on or turned-off in response to the control voltage Vg3.

In response to the control voltages Vg1, Vg2 and Vg3 provided by the control circuit 810, the first switching circuit 110, the second switching circuit 210 and the third switching circuit 310 are bi-directionally conducted, uni-directionally conducted or cut off, so as to charge the first output capacitor Cb1 or a second output capacitor Cb2, such that the voltage value Vb1 of the first output capacitor Cb1 and the voltage value Vb2 of the second output capacitor Cb2 meet a predetermined condition. When the predetermined condition is met, voltage value Vb1 and voltage value Vb2 reach voltage balancing.

In an example, when the voltage value Vb1 of the first output capacitor Cb1 is greater than the voltage value Vb2 of the second output capacitor Cb2, the control circuit 810 controls the second switch 200 to be turned-on according to the control voltage Vg2, and the second switching circuit 210 is bi-directionally conducted. Furthermore, the control circuit 810 controls the third switch 300 to be turned-off according to the control voltage Vg3, and the third switching circuit 310 is uni-directionally conducted. According to the bi-directionally conducted second switching circuit 210 and the uni-directionally conducted third switching circuit 310, the second secondary side winding S2 charges the second output capacitor Cb2 to increase the voltage value Vb2 of the second output capacitor Cb2, so that the voltage value Vb2 is increased to be equal to the voltage value Vb1 of the first output capacitor Cb1, and a voltage balancing between the voltage value Vb1 and the voltage value Vb2 is achieved.

The power conversion circuit 1000 of the present disclosure has a "flyback" architecture, and the power conversion circuit 1000 is referred to as a flyback converter. The input power supply 700 is, for example, an AC power supply or a DC power supply, and the input power supply 700 is associated with the primary side of the transformer 400. The load circuit 600 is associated with the secondary side of the transformer 400. The input power supply 700 may be electrically isolated from the load circuit 600 by the transformer 400. Furthermore, the first switching circuit 110 is associated with the primary side of the transformer 400, and the second switching circuit 210 and the third switching circuit 310 are associated with the secondary side of the transformer 400.

Figure 3A:
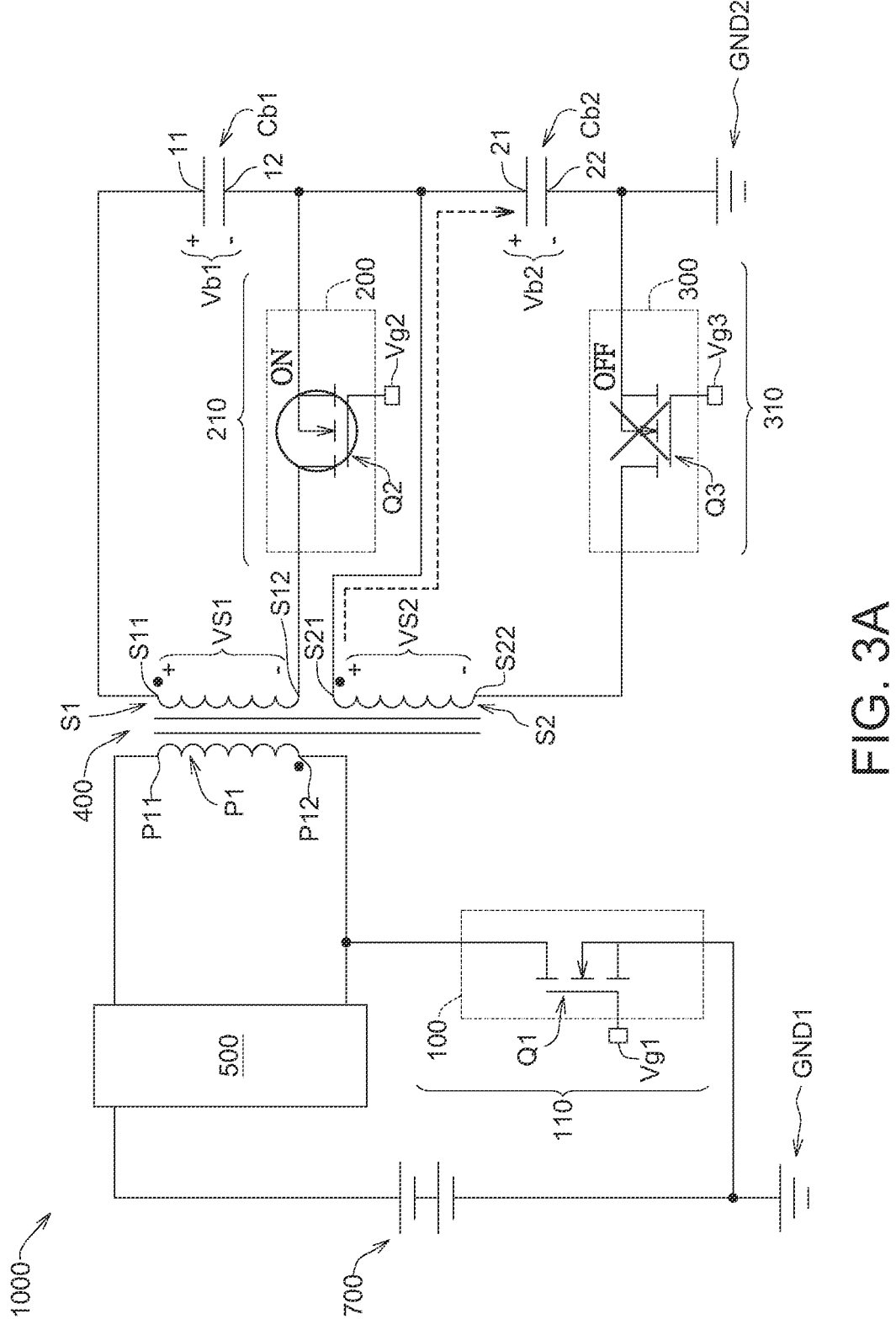
FIGS. 3A and 3B are schematic diagrams of an embodiment of voltage balancing operation performed by the power conversion circuit 1000 of FIG. 2B.
Figure 3B:
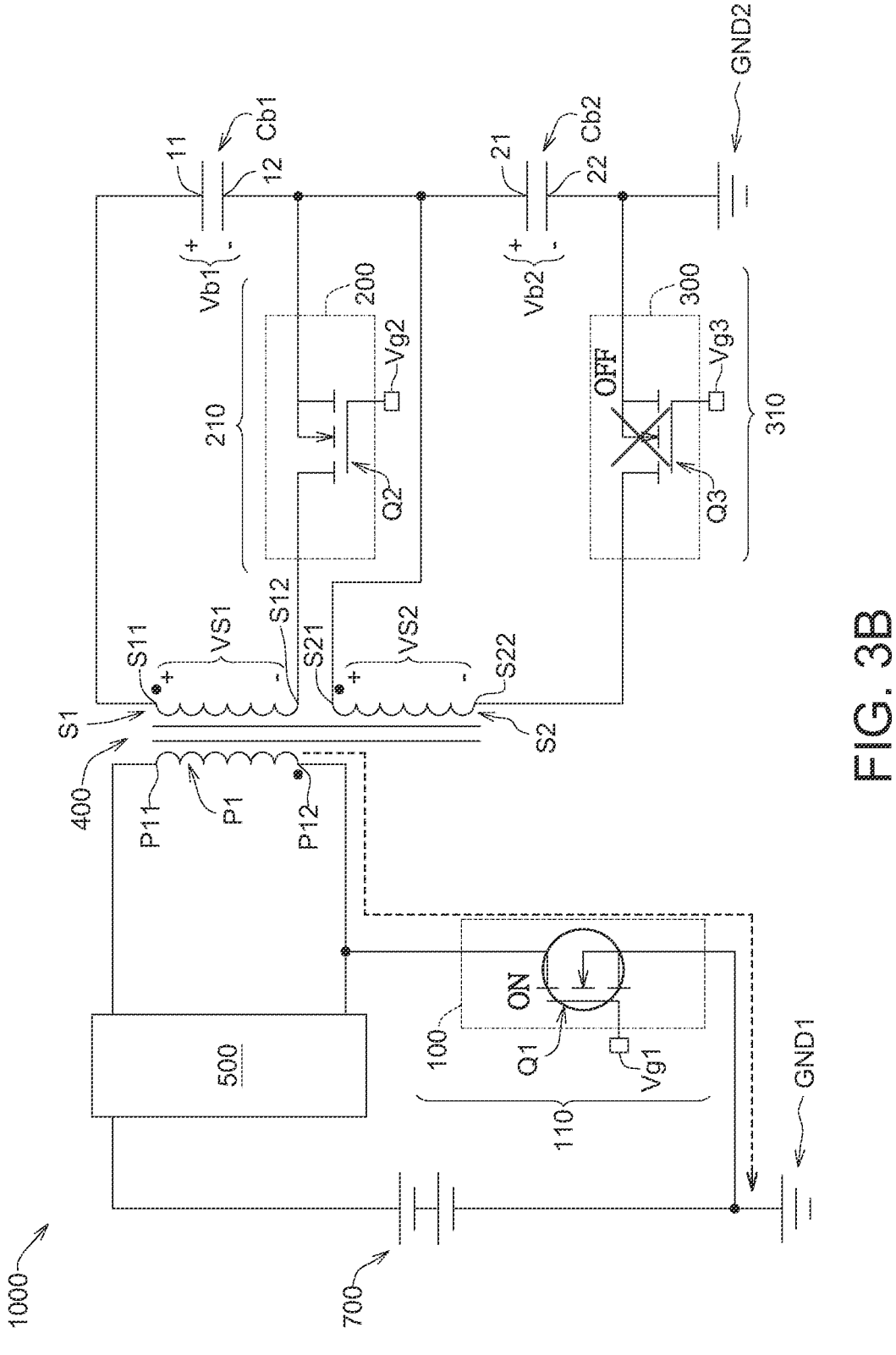

FIGS. 3A and 3B are schematic diagrams of an embodiment of voltage balancing operation performed by the power conversion circuit 1000 of FIG. 2B. In a feed-forward mode, when the voltage value Vb1 of the first output capacitor Cb1 and the voltage value Vb2 of the second output capacitor Cb2 are unbalanced, the control circuit 810 controls the first switching circuit 110, the second switching circuit 210 and the third switching circuit 310 to be turned-on or turned-off respectively according to the voltage value Vb1 and the voltage value Vb2, so as to charge the first output capacitor Cb1 or the second output capacitor Cb2 and thereby changing the voltage value Vb1 and the voltage value Vb2.

The power conversion circuit 1000 may operate in a feed-forward, in which, when the voltage value Vb1 of the first output capacitor Cb1 is greater than the voltage value Vb2 of the second output capacitor Cb2, the second switching circuit 210 serves as the main switch of the feed-forward mode, and charges the second output capacitor Cb2 through the second switching circuit 210, hence increasing the voltage value Vb2 of the second output capacitor Cb2. Furthermore, the first switching circuit 110 serves as a synchronous switch to release the electric energy on the primary side of the transformer 400 to reset the magnetic field of the transformer 400.

More specifically, as shown in FIG. 3A, in the second switching circuit 210, the transistor Q2 of the second switch 200 operates in response to the control voltage Vg2 provided by the control circuit 810 (not shown in FIG. 3A). When the control voltage Vg2 is a first potential with a higher voltage value (for example, 15V), the transistor Q2 is turned-on (shown as "ON" in FIG. 3A), and the second switching circuit 210 is bi-directionally conducted. Accordingly, the second terminal S12 of the first secondary side winding S1 is electrically connected to the second terminal 12 of the first output capacitor Cb1 through the second switching circuit 210. The voltage difference VS1 between the first terminal S11 and the second terminal S12 of the first secondary side winding S1 is equal to the voltage value Vb1 of the first output capacitor Cb1. Since the turns number TNS1 of the first secondary side winding S1 is equal to the turns number TNS2 of the second secondary side winding S2, the voltage difference VS2 of the second secondary side winding S2 is equal to the voltage difference VS1 of the first secondary side winding S1. The voltage difference VS2 of the second secondary side winding S2 is also equal to the voltage value Vb1 of the first output capacitor Cb1. Moreover, since the voltage value Vb1 of the first output capacitor Cb1 is greater than the voltage value Vb2 of the second output capacitor Cb2, and the voltage difference VS2 of the second secondary side winding S2 is greater than the voltage value Vb2 of the second output capacitor Cb2, hence the potential of the first terminal S21 of the second secondary side winding S2 is higher than the potential of the first terminal 21 of the second output capacitor Cb2.

On the other hand, in the third switching circuit 310, the transistor Q3 of the third switch 300 operates in response to the control voltage Vg3 provided by the control circuit 810. When the control voltage Vg3 is a second potential with a lower voltage value (for example, 0V), the transistor Q3 is turned-off (shown as "OFF" in the figures), and the third switching circuit 310 is uni-directionally conducted through the parasitic diode (not shown in FIG. 3A).

According to the second switching circuit 210 of the bi-directionally conducted third switching circuit 310, the second secondary side winding S2 may serve as an output winding coil to charge the second output capacitor Cb2, thereby increasing the potential of the first terminal 21 of the second output capacitor Cb2. Therefore, the voltage value Vb2 of the second output capacitor Cb2 may be increased so that the voltage value Vb2 of the second output capacitor Cb2 is equal to the voltage value Vb1 of the first output capacitor Cb1, and a voltage balancing between the voltage value Vb2 and the voltage value Vb1 may be achieved.

Next, in the example of FIG. 3B, the electric energy of the first secondary side winding S1 and the second secondary side winding S2 of the transformer 400 is coupled to the primary side winding P1. The first switching circuit 110 serves as a synchronous switch, and the primary side winding P1 serves as a reset winding coil to release electric energy according to the operation of the first switching circuit 110. Accordingly, the electric energy on the primary side of the transformer 400 may be released, and the reset of magnetic field of the transformer 400 may be achieved.

More specifically, in the first switching circuit 110, the transistor Q1 of the first switch 100 operates in response to the control voltage Vg1. When the control voltage Vg1 is a first potential with a higher voltage value (for example, 15V), the transistor Q1 is turned-on (shown as "ON" in FIG. 3B), and the first switching circuit 110 is bi-directionally conducted. Accordingly, the primary side winding P1 may be connected to the input power supply 700 through the first switching circuit 110, so that the transformer 400 utilizes the voltage provided by the input power supply 700 to achieve magnetic field reset of the transformer 400.

Figure 4:
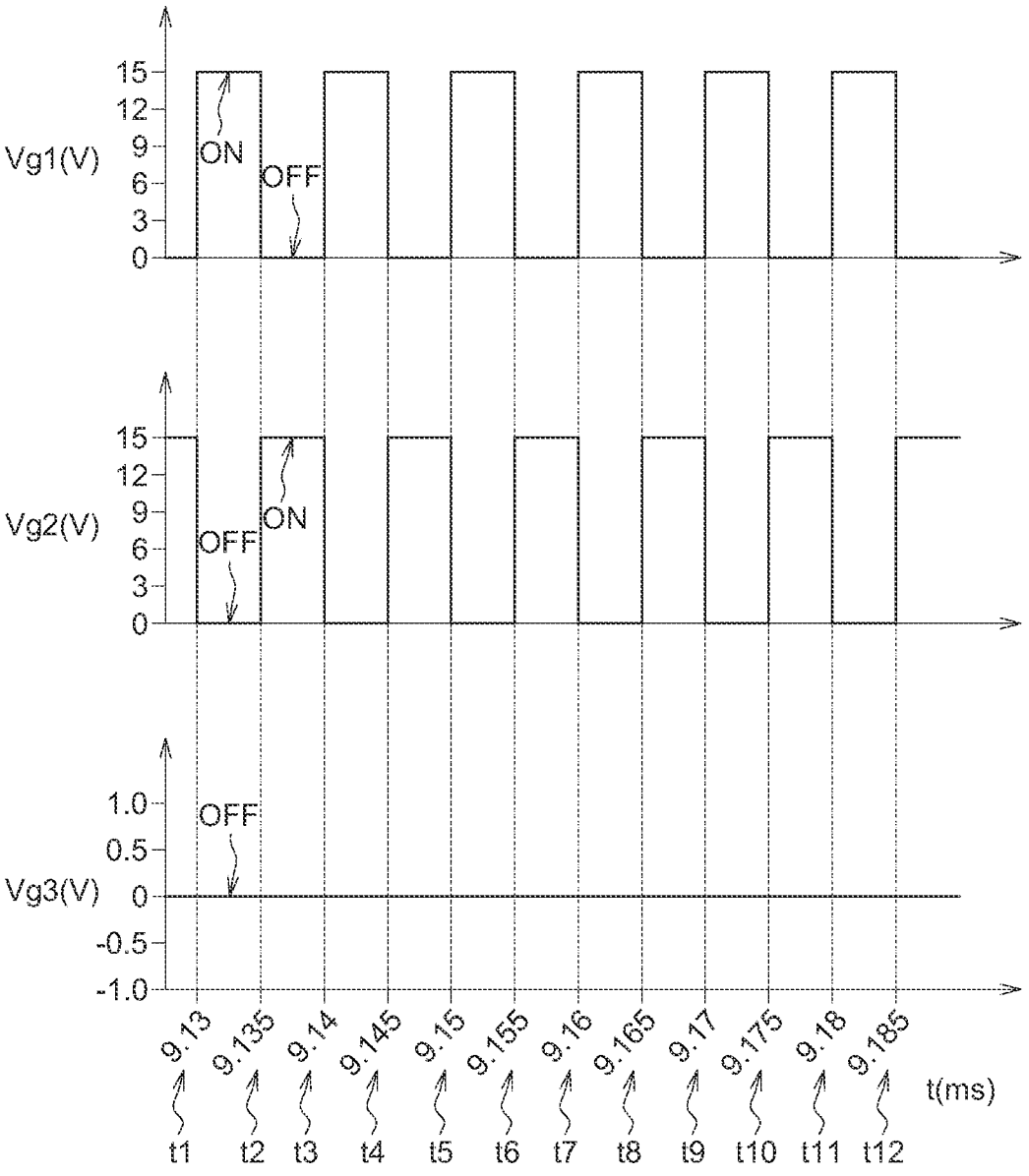
FIG. 4 is a time variation diagram of the control voltages Vg1, Vg2 and Vg3 of the transistors Q1, Q2 and Q3 of the first switch 100, the second switch 200 and the third switch 300 respectively.

FIG. 4 is a time variation diagram of the control voltages Vg1, Vg2 and Vg3 of the transistors Q1, Q2 and Q3 of the first switch 100, the second switch 200 and the third switch 300 respectively. The time variations of the control voltages Vg1, Vg2 and Vg3 shown in FIG. 4 are accompanied by the voltage balancing operation shown in FIGS. 3A and 3B. Please refer to FIG. 4, in different periods of time t, the control voltage Vg1 of the transistor Q1 of the first switch 100 and the control voltage Vg2 of the transistor Q2 of the second switch 200 respectively have a first potential with a higher voltage value (for example, 15V) or a second potential with a lower voltage value (for example, 0V). When the control voltage Vg1 of the transistor Q1 is the first potential, the control voltage Vg2 of the transistor Q2 is the second potential. In contrast, when the control voltage Vg1 of the transistor Q1 is the second potential, the control voltage Vg2 of the transistor Q2 is the first potential.

The control voltage Vg1 and the control voltage Vg2 alternately change between the first potential and the second potential according to the time t, so that the transistor Q1 and the transistor Q2 are alternately turned-on or turned-off according to the time t. The second switching circuit 210 serves as the main switch in the feed-forward mode, and the first switching circuit 110 serves as the synchronous switch. The main switch and the synchronous switch are also alternately turned-on or turned-off according to time t.

On the other hand, the control voltage Vg3 of the transistor Q3 of the third switch 300 is maintained at the second potential, and the transistor Q3 is maintained at a turned-off state. Therefore, the third switching circuit 310 does not operate.

In the example of FIG. 4, during the period from time point t1 to time point t2, the control voltage Vg1 is the first potential and the control voltage Vg2 is the second potential, hence the transistor Q1 is turned-on (shown as "ON" in FIG. 4) and transistor Q2 is turned-off (shown as "OFF" in FIG. 4). The period from time point t1 to time point t2 corresponds to the operation of FIG. 3B. During the period from time point t1 to time point t2, the primary side winding P1 serves as a reset winding coil to reset the magnetic field of the transformer 400.

Then, during the period from time point t2 to time point t3, the control voltage Vg1 changes to the second potential, and the control voltage Vg2 changes to the first potential. Therefore, the transistor Q1 is turned-off (shown as "OFF" in FIG. 4) and transistor Q2 is turned-on (shown as "ON" in FIG. 4). The period from time point t2 to time point t3 corresponds to the operation of FIG. 3A. During the period from time point t2 to time point t3, the second secondary side winding S2 serves as an output winding coil to charge the second output capacitor Cb2.

Then, during the period from time point t3 to time point t4, the control voltage Vg1 changes to the first potential again, and the control voltage Vg2 changes to the second potential again, hence the transistor Q1 is turned-on and the transistor Q2 is turned-off. The primary side winding P1 serves as a reset winding coil to reset the magnetic field of the transformer 400.

Likewise, during the subsequent period from time point t4 to time point t5, the control voltage Vg1 changes to the second potential again, and the control voltage Vg2 changes to the first potential again, hence the transistor Q1 is turned-off and the transistor Q2 is turned-on. The second secondary side winding S2 serves as an output winding coil to charge the second output capacitor Cb2.

According to the above operating manner, during the periods of time points t2~t3, time points t4~15, time points t6~t7, time points t8~19 and time points t10~t11 (referred as the "first period"), the control voltage Vg2 is the first potential, the transistor Q2 is turned-on, and the first secondary side winding S1 serves as an output winding coil to charge the second output capacitor Cb2. During the first period, the voltage value Vb2 of the second output capacitor Cb2 is gradually increased until the voltage value Vb2 is equal to the voltage value Vb1 of the first output capacitor Cb1 and reaches voltage balancing.

On the other hand, during the periods of time points t1~12, time points t3~t4, time points t5~t6, time points t7~t8 and time points t9~t10 (referred to as the "second period"), the control Voltage Vg1 is the first potential, and transistor Q1 is turned-on. Accordingly, during the second period, the primary side winding P1 serves as a reset winding coil to reset the magnetic field of the transformer 400.

In other words, during the first period, the control circuit 810 controls the first switching circuit 110 to be turned-off, the second switching circuit 210 to be bi-directionally conducted, and the third switching circuit 310 to be uni-directionally conducted, and the voltage value Vb2 of the second output capacitor Cb2 is gradually increased during the first period. On the other hand, during the second period, the control circuit 810 controls the first switching circuit 110 to be turned-on, and the second switching circuit 210 to be turned-off, thereby resetting the magnetic field of the transformer 400 during the second period. The first period (time points t2~t3, time points t4~t5, time points t6~t7, time points t8~t9 and time points t10~t11) and the second period (time points t1~t2, time points t3~t4, time points t5~t6, time points t7~t8 and time points t9~t10) do not overlap each other.

Figure 5A:
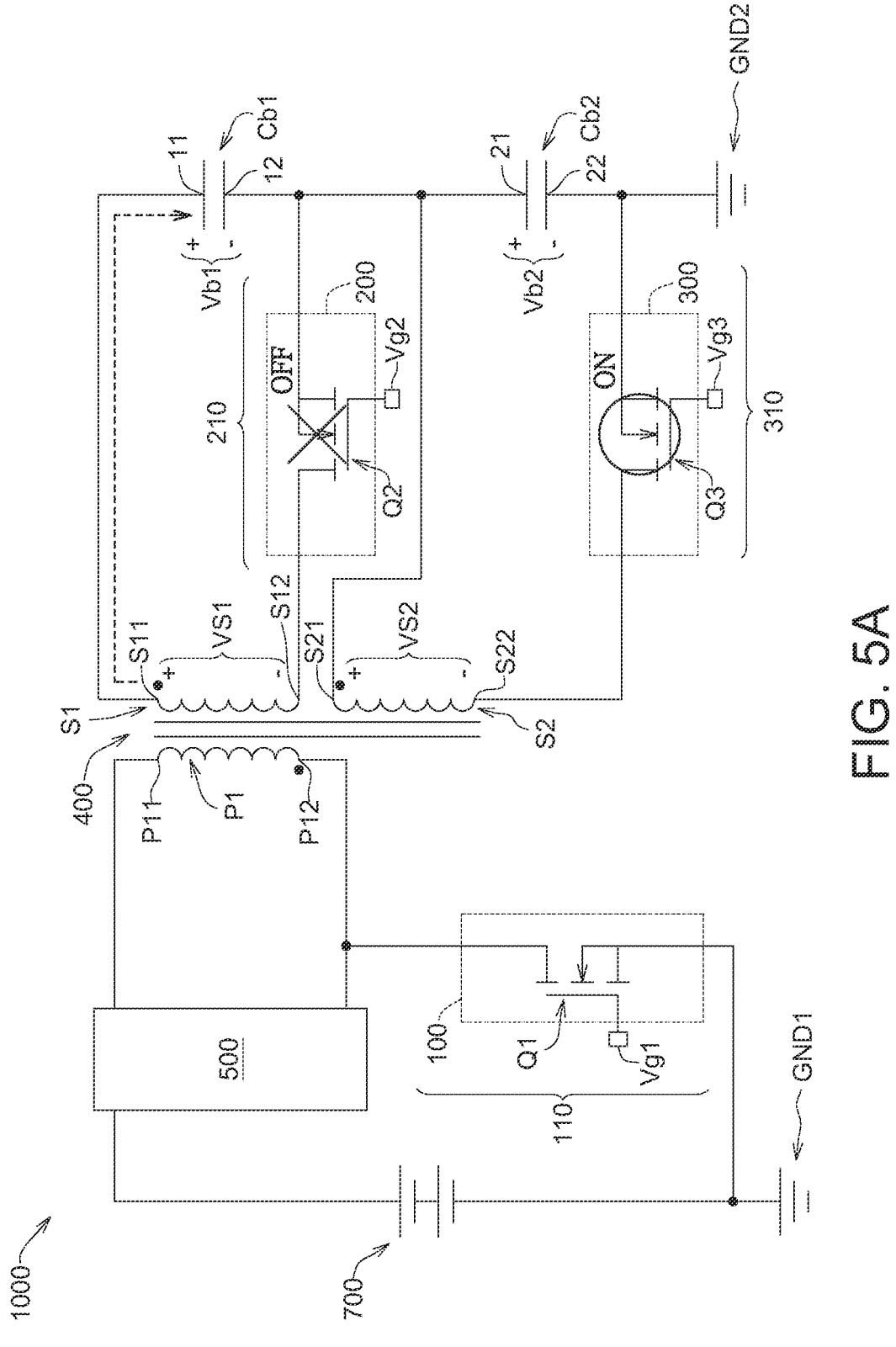
FIGS. 5A and 5B are schematic diagrams of another embodiment of voltage balancing operation performed by the power conversion circuit 1000 in FIG. 2B.
Figure 5B:
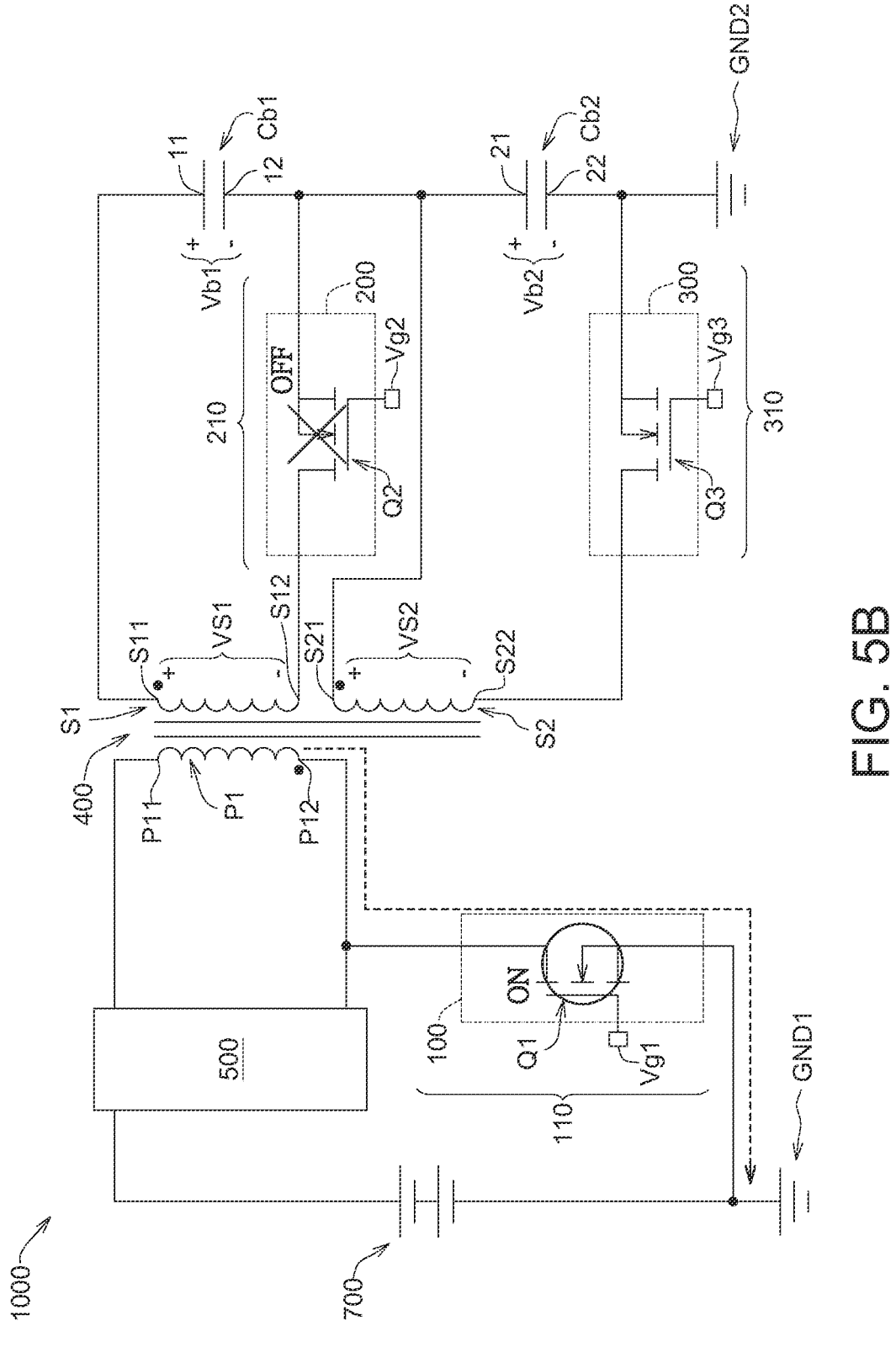

FIGS. 5A and 5B are schematic diagrams of another embodiment of voltage balancing operation performed by the power conversion circuit 1000 in FIG. 2B. In the feed-forward mode, when the voltage value Vb2 of the second output capacitor Cb2 is greater than the voltage value Vb1 of the first output capacitor Cb1, the third switching circuit 310 serves as the main switch of the feed-forward mode, and charges the first output capacitor Cb1 through the third switching circuit 310, so as to increase the voltage value Vb1 of the first output capacitor Cb1. Furthermore, the first switching circuit 110 serves as a synchronous switch to release the electric energy of the primary side of the transformer 400 and achieve magnetic field reset of the transformer 400.

More specifically, as shown in FIG. 5A, in the third switching circuit 310, when the control voltage Vg3 is a first potential with a higher voltage value (for example, 15V), the transistor Q3 of the third switch 300 is turned-on (shown as "ON" in FIG. 5A), and the third switching circuit 310 is bi-directionally conducted. Accordingly, the second terminal S22 of the second secondary side winding S2 is electrically connected to the second terminal 22 of the second output capacitor Cb2 through the third switching circuit 310, and the voltage difference VS2 between the first terminal S21 and the second terminal S22 of the second secondary side winding S2 is equal to the voltage value Vb2 of the second output capacitor Cb2. Since the turns number TNS1 of the first secondary side winding S1 is equal to the turns number TNS2 of the second secondary side winding S2, the voltage difference VS1 of the first secondary side winding S1 is equal to the voltage difference VS2 of the second secondary side winding S2, and equal to the voltage value Vb2 of the second output capacitor Cb2. Moreover, since the voltage value Vb2 of the second output capacitor Cb2 is greater than the voltage value Vb1 of the first output capacitor Cb1, the potential of the first terminal S11 of the first secondary side winding S1 is higher than that of the first terminal 11 of the first output capacitor Cb1.

On the other hand, in the second switching circuit 210, when the control voltage Vg2 is a second potential with a lower voltage value (for example, 0V), the transistor Q2 of the second switch 200 is turned-off (shown as "OFF" in the figures), and the second switching circuit 210 is uni-directionally conducted through the parasitic diode (not shown in FIG. 5A). According to the bi-directionally conducted third switching circuit 310 and the uni-directionally conducted second switching circuit 210, the first secondary side winding S1 may serve as an output winding coil to charge the first output capacitor Cb1, thereby increasing the potential of the first terminal 11 of the first output capacitor Cb1 to achieve the voltage balancing between the voltage value Vb2 and the voltage value Vb1.

Next, in the example of FIG. 5B, the first switching circuit 110 serves as a synchronous switch, and the transistor Q1 is turned-on (shown as "ON" in FIG. 5B), and the first switching circuit 110 is bi-directionally conducted. According to the operation of the first switching circuit 110, the primary side winding P1 serves as a reset winding coil to release electric energy. Accordingly, the primary side winding P1 serves as a reset winding coil to release electrical energy of the primary side of the transformer 400, and the transformer 400 utilizes the voltage provided by the input power supply 700 to achieve magnetic field reset of the transformer 400.

Figure 6:
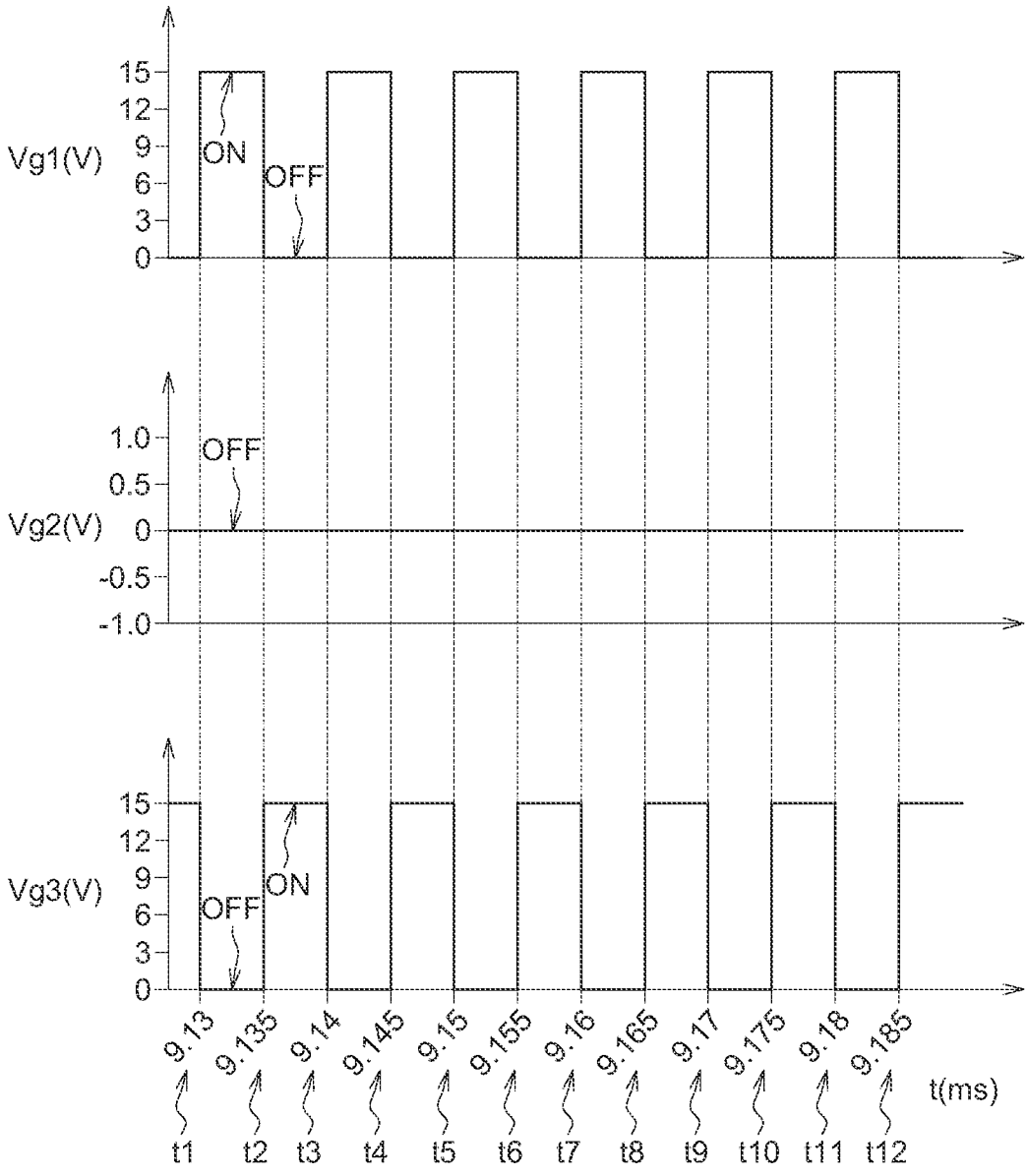
FIG. 6 is another time variation diagram of the control voltages Vg1, Vg2 and Vg3 of the transistors Q1, Q2 and Q3 of the first switch 100, the second switch 200 and the third switch 300 respectively.

FIG. 6 is another time variation diagram of the control voltages Vg1, Vg2 and Vg3 of the transistors Q1, Q2 and Q3 of the first switch 100, the second switch 200 and the third switch 300 respectively. The time variations of the control voltages Vg1, Vg2 and Vg3 shown in FIG. 6 are accompanied by the voltage balancing operation shown in FIGS. 5A and 5B. Please refer to FIG. 6, in different periods of time t, the control voltage Vg1 of the transistor Q1 of the first switch 100 and the control voltage Vg3 of the transistor Q3 of the third switch 300 respectively have a first potential with a higher voltage value (for example, 15V) or the second potential with a lower voltage value. The control voltage Vg1 and the control voltage Vg3 alternately change between the first potential and the second potential according to the time t, hence the transistor Q1 and the transistor Q3 are alternately turned-on or turned-off according to the time t. The third switching circuit 310 serves as the main switch in the feed-forward mode, and the first switching circuit 110 serves as the synchronous switch. The main switch and the synchronous switch are also alternately turned-on or turned-off according to time t.

On the other hand, the control voltage Vg2 of the transistor Q2 of the second switch 200 is maintained at the second potential, and the transistor Q2 is maintained in a turned-off state. Therefore, the second switching circuit 210 does not operate.

During the periods of time points t2~t3, time points t4~t5, time points t6~t7, time points t8~t9 and time points t10~t11 (i.e., the "first period"), the control voltage Vg3 is the first potential, the transistor Q3 is turned-on, and the first secondary side winding S1 serves as an output winding coil to charge the first output capacitor Cb1. During the first period, the voltage value Vb1 of the first output capacitor Cb1 is gradually increased until the voltage value Vb1 is equal to the voltage value Vb2 of the second output capacitor Cb2 and reaches voltage balancing.

On the other hand, during the periods of time points t1~t2, time points t3~t4, time points t5~t6, time points t7~t8, and time points t9~t10 (i.e., the "second period"), the control Voltage Vg1 is the first potential, and transistor Q1 is turned-on. Accordingly, during the second period, the primary side winding P1 serves as a reset winding coil to reset the magnetic field of the transformer 400.

Figure 7:
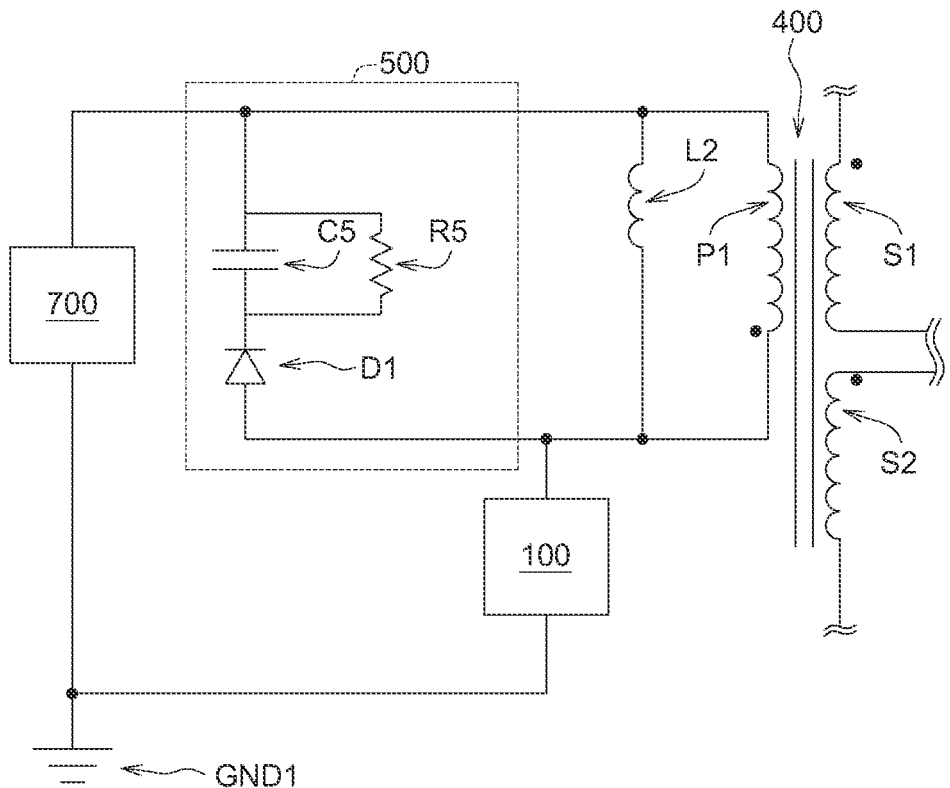
FIG. 7 is a detailed circuit diagram of the snubber circuit 500.

FIG. 7 is a detailed circuit diagram of the snubber circuit 500. As shown in FIG. 7, the snubber circuit 500 cooperates with the transformer 400 and the first switching circuit 110. The snubber circuit 500 includes a capacitor C5, a resistor R5 and a diode D1. The capacitor C5 is connected to the resistor R5 in parallel. The capacitor C5 and the resistor R5 are commonly connected to the cathode of diode D1. The snubber circuit 500 has a function of buffer, which is used to reduce the voltage stress of the first switching circuit 110 connected to the primary side of the transformer 400. When a surge voltage occurs on the primary side of the transformer 400, the snubber circuit 500 may absorb the surge energy associated with the surge voltage to protect the first switching circuit 110.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A power conversion circuit, comprising:
a transformer, comprising a primary side winding, a first secondary side winding and a second secondary side winding;
a first switching circuit, connected to the primary side winding;
a second switching circuit, connected to the first secondary side winding;
a third switching circuit, connected to the second secondary side winding;
a first output capacitor, connected to the second switching circuit and the first secondary side winding, the first output capacitor has a first voltage value;
a second output capacitor, connected to the third switching circuit and the second secondary side winding, the second output capacitor has a second voltage value; and
a control circuit, electrically connected to the first switching circuit, the second switching circuit and the third switching circuit,
wherein, the control circuit controls the first switching circuit, the second switching circuit and the third switching circuit to be turned-on or turned-off respectively according to the first voltage value and the second voltage value, and to charge the first output capacitor or the second output capacitor,
wherein when the first voltage value of the first output capacitor is greater than the second voltage value of the second output capacitor, the control circuit controls the second switching circuit and the third switching circuit to be turned-on, the second secondary side winding charges the second output capacitor and the second switching circuit is bi-directionally conducted, and
wherein when the third switch is turned-on, the third switching circuit is bi-directionally conducted, and when the third switch is turned-off, the third switching circuit is uni-directionally conducted.

2. The power conversion circuit according to claim 1, wherein the first output capacitor is connected to the second output capacitor in series, and the first output capacitor and the second output capacitor are connected to a load circuit, or the first output capacitor and the second output capacitor are respectively connected to a load circuit.

3. The power conversion circuit according to claim 1, wherein a turns number of the first secondary side winding is the same as a turns number of the second secondary side winding.

4. The power conversion circuit according to claim 1, wherein the control circuit controls the first switching circuit to be turned-off during a first period and controls the second switching circuit to be turned-on, and during a second period the first switching circuit is controlled to be turned-on and the second switching circuit is controlled to be turned-off, and the first period does not overlap the second period.

5. The power conversion circuit according to claim 1, wherein the first switching circuit, the second switching circuit and the third switching circuit respectively have a first switch, a second switch and a third switch, the first switch is electrically connected to the primary side winding and the control circuit, the second switch is electrically connected to the first secondary side winding and the first output capacitor, and the third switch is electrically connected to the second secondary side winding and the second output capacitor,
wherein when the second switch is turned-off, the second switching circuit is uni-directionally conducted.

6. The power conversion circuit according to claim 1, wherein when the control circuit controls the first switching circuit to be turned-on, the primary side winding resets a magnetic field of the transformer.

7. The power conversion circuit according to claim 1, wherein when the first voltage value of the first output capacitor is less than the second voltage value of the second output capacitor, the control circuit controls the second switching circuit and the third switching circuit to be turned-on, and the first secondary side winding charges the first output capacitor,
wherein, the second switching circuit is uni-directionally conducted, and the third switching circuit is bi-directionally conducted.

8. The power conversion circuit according to claim 7, wherein the control circuit controls the first switching circuit to be turned-off during a first period and controls the third switching circuit to be turned-on, and during a second period the first switching circuit is controlled to be turned-on and the third switching circuit is controlled to be turned-off, and the first period does not overlap the second period.

9. The power conversion circuit according to claim 1, further comprising:
a snubber circuit, electrically connected to the primary side winding and the first switching circuit, and the snubber circuit comprises a capacitor, a resistor and a diode, the capacitor is connected to the resistor in parallel, and the diode is connected to the first switching circuit.

* * * * *